(12) United States Patent
Hasegawa

(10) Patent No.: US 7,126,276 B2
(45) Date of Patent: Oct. 24, 2006

(54) NON-EVAPORATION TYPE GETTER, DISPLAY UNIT AND PRODUCTION METHOD FOR THEM

(75) Inventor: Yoji Hasegawa, Kanagawa (JP)

(73) Assignee: Sony Corporation(JP)

( * ) Notice: Subject to any disclaimer, the term of this patent is extended or adjusted under 35 U.S.C. 154(b) by 363 days.

(21) Appl. No.: 10/482,380

(22) PCT Filed: Jun. 28, 2002

(86) PCT No.: PCT/JP02/06608

§ 371 (c)(1),
(2), (4) Date: Dec. 31, 2003

(87) PCT Pub. No.: WO03/005400

PCT Pub. Date: Jan. 16, 2003

(65) Prior Publication Data

US 2004/0169469 A1  Sep. 2, 2004

(30) Foreign Application Priority Data

Jul. 6, 2001 (JP) .............................. 2001-205930

(51) Int. Cl.
*H01J 19/70* (2006.01)
(52) U.S. Cl. ......................................... 313/553; 417/51
(58) Field of Classification Search ............... 313/561, 313/553, 557, 559, 562; 417/48–51
See application file for complete search history.

(56) References Cited

U.S. PATENT DOCUMENTS 3,926,832 A * 12/1975 Barosi ...................... 252/181.6

FOREIGN PATENT DOCUMENTS

| EP | 0 455 162 A2 | 11/1991 |
|----|--------------|---------|
| JP | 8-225806 | 9/1996 |
| JP | 10-251707 | 9/1998 |
| JP | 2000-311588 | 11/2000 |
| JP | 2001-76648 | 3/2001 |
| JP | 2001-158925 | 6/2001 |

OTHER PUBLICATIONS

International Search Report dated Oct. 15, 2002.

* cited by examiner

*Primary Examiner*—Joseph Williams
(74) *Attorney, Agent, or Firm*—Rader, Fishman & Grauer PLLC; Ronald P. Kananen

(57) ABSTRACT

Disclosed are a non-evaporation type getter excellent in gettering effect, capable of maintaining the inside of a gas-tight container in a display apparatus, particularly a flat panel display apparatus or the like, in a high vacuum condition, easy to mount and less liable to contaminate the inside of the gas-tight container, a display apparatus including the getter, and methods of manufacturing the same. The non-evaporation type getter (20) includes a molded body including at least one element selected from the group consisting of Ti, Zr, Al, V, and Fe as a principal constituent thereof, the molded body formed by powder injection molding. The molded body is composed of a porous body having a porosity of 10 to 30%.

9 Claims, 7 Drawing Sheets

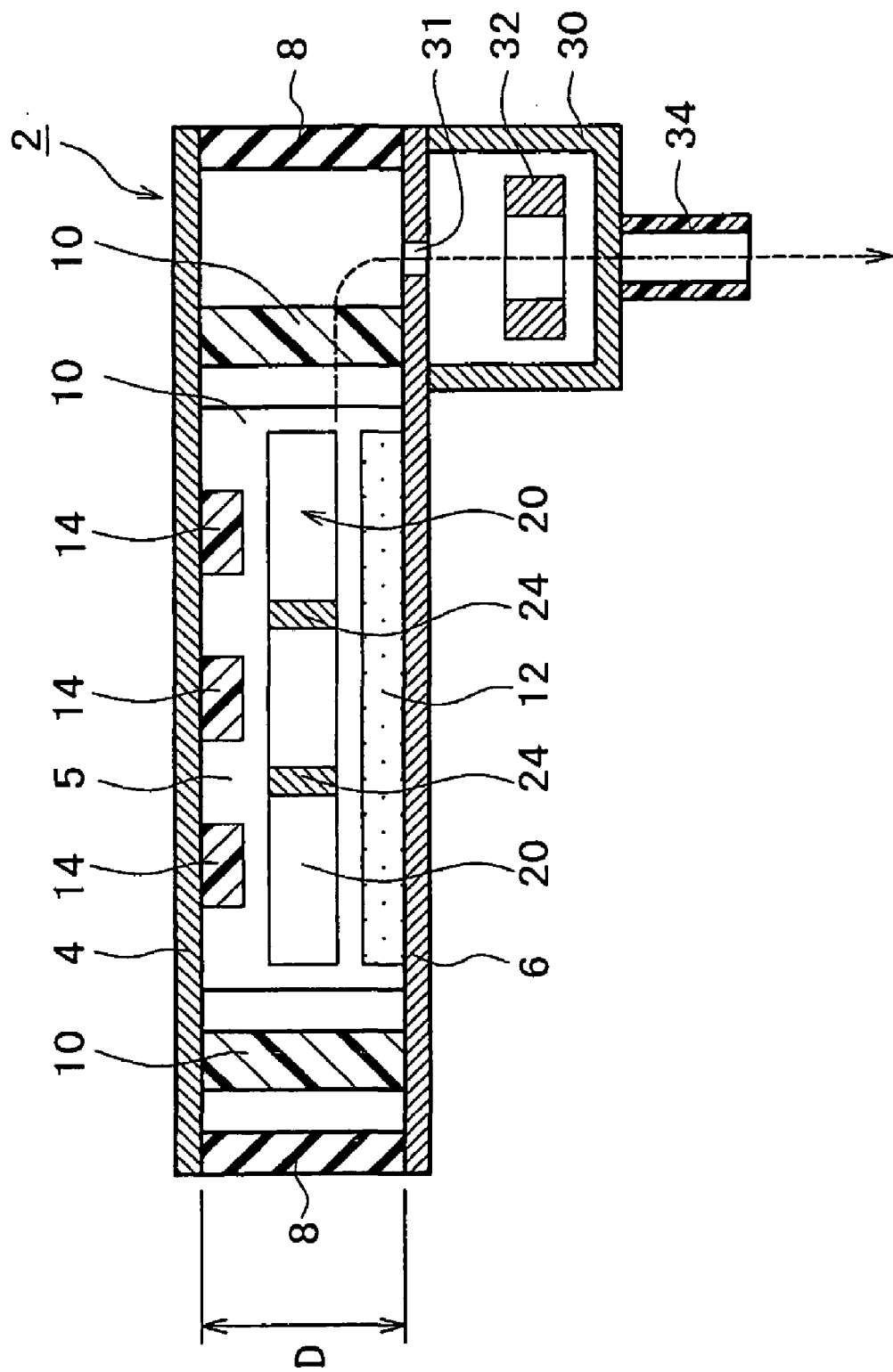

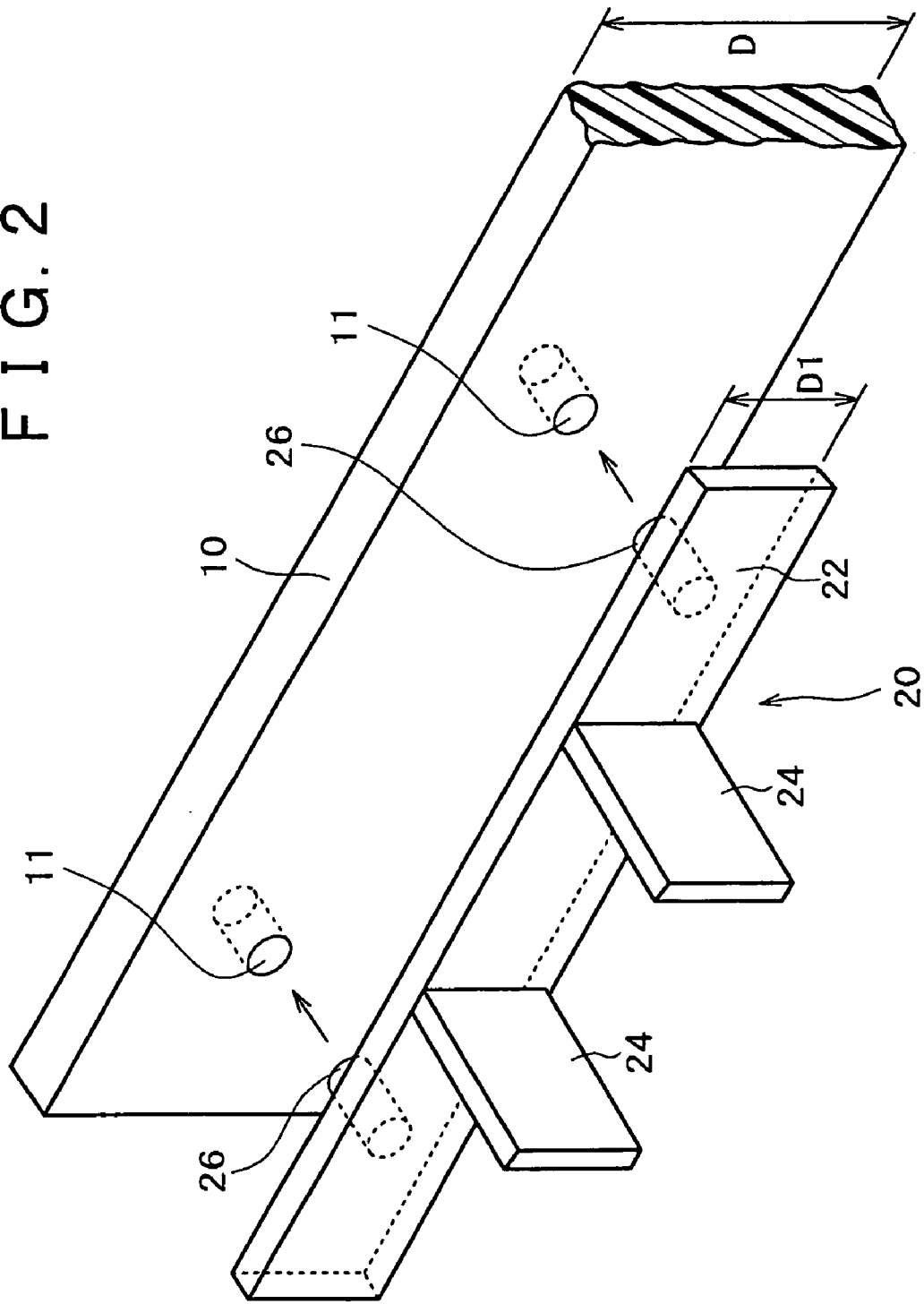

NON-EVAPORATION TYPE GETTER, DISPLAY UNIT AND PRODUCTION METHOD FOR THEM

TECHNICAL FIELD

The present invention relates to a non-evaporation type getter, a display apparatus, and methods of manufacturing the same.

BACKGROUND ART

In recent years, there have been proposed flat panel display apparatuses in which phosphors are irradiated with electron beams emitted from electron emission sources, such as field emission devices, to cause the phosphors to emit light, and thereby forming an image, such as a field emission display (hereinafter abridged to FED).

In an FED, a substrate provided with electron emission sources arranged in a matrix form and a substrate provided with phosphors are disposed opposite to each other with a minute gap therebetween, the peripheries of the substrates are sealed to form a gas-tight container, the inside of the gas-tight container is maintained in a high vacuum or an ultrahigh vacuum, and the phosphors are irradiated with electron beams emitted from electron emission sources to cause the phosphors to emit light, and thereby displaying an image.

For an assured operation of the FED, it is necessary to maintain the inside of the gas-tight container formed between the substrates in an ultrahigh vacuum (a pressure of not higher than about $1 \times 10^{-6}$ Pa). This is because, at a lower degree of vacuum (namely, at a higher pressure), field emission devices used as the electron emission sources are contaminated, leading to a trouble regarding the electron emission characteristics (emission characteristics) and shortening the life of the FED.

Thus, in a flat panel display apparatus including therein a gas-tight container with a high degree of vacuum, such as the FED, a vapor-deposition-type getter is disposed inside a getter chamber disposed at an end portion of the gas-tight container, in order to enhance the degree of vacuum inside the gas-tight container by the gettering effect. In addition, provision of a non-evaporation-type getter inside the gas-tight container also has been proposed.

In the flat panel display apparatus, such as the FED, the gap between a front substrate and a back substrate is as minute as about 1.5 mm or less, and it is difficult to bring the inside space to an ultrahigh vacuum, but it is important to maintain all locations in the inside space at a uniform degree of vacuum. Besides, in an operation of the FED, the irradiation of a phosphor surface with electrons discharged from the field emission devices causes liberation of a gas or gases. When a gradient of the degree of vacuum is generated as a result of the liberation of a gas or gases, the region where the field emission devices are formed on the back substrate the field emission devices may be contaminated depending on the location, and the emission characteristics at the contaminated portions are degraded, resulting in a shortening of the life of the FED. Therefore, with only the vapor-deposition-type getter disposed only at an end portion of the gas-tight container, generation of a gradient of the degree of vacuum cannot be obviated. In view of this, in the flat panel display apparatuses such as the FED, the need to dispose non-evaporation-type getters in a dispersed manner has been increasing, in order to maintain the inside of the gas-tight container at a uniform ultrahigh vacuum.

Conventionally, the non-evaporation-type getters have been formed by vapor deposition or sputtering. In the formation of the non-evaporation-type getters, it is necessary to form the non-evaporation-type getters at positions for avoiding the field emission device pattern and the phosphor pattern, resulting in a difficulty on a manufacturing process basis that an accurate masking treatment is needed. If the masking is unsatisfactory and the field emission devices are contaminated due to vapor deposition or the like, a trouble as to emission characteristics is generated, and the life of the flat panel display apparatus, such as the FED, is shortened.

Incidentally, there have also been proposed some methods of forming non-evaporation-type getters by a film forming process other than vapor deposition and sputtering. For example, Japanese Patent Laid-open No. Hei 5-159697 proposes a method of producing a non-evaporation-type getter by a powder processing molding or powder press molding sintering technique.

According to the method disclosed in the publication, however, cracking or deformation is liable to occur at the time of sintering due to such causes as a distribution of the shrinkage factor, so that there is the limitation that it is impossible to form a non-evaporation-type getter having a complicated shape. Besides, the powder molding leads to the problem of dusting.

As a method of disposing and fixing a non-evaporation-type getter formed by the powder press molding sintering technique or the like in the inside of a flat panel display apparatus, there has been proposed a method of fixing the non-evaporation-type getter by use of an adhesive, as disclosed, for example, in Japanese Patent Laid-open No. 2000-311638. In the method, however, it is difficult to achieve masking at the time of applying the adhesive. Besides, depending on the kind of adhesive, a gas may be liberated from the adhesive during or after a thermal activating treatment of the getter, leading to a lowering of the gas absorbing capability of the getter or to contamination of the field emission devices, with the result of degradation of the emission characteristics. In addition, to obviate such an inconvenience, it is necessary to devise a measure for preventing the liberation of gas from the adhesive.

Thus, particularly in a flat panel display apparatus, it has been very difficult to dispose the non-evaporation-type getter.

The present invention has been made in consideration of the above-mentioned circumstances. Accordingly, it is a first object of the present invention to provide a non-evaporation-type getter which is excellent in gettering effect, capable of maintaining the inside of a gas-tight container in a display apparatus, particularly in a flat panel display apparatus or the like, in a high vacuum condition, easy to mount and less liable to contaminate the inside of the gas-tight container, a display apparatus including the getter, and methods of manufacturing the same.

It is a second object of the present invention to provide a flat display apparatus capable of enhancing the reliability characteristic of emission of electron beams from electron emission sources, such as field emission devices, and contriving a longer life, and a method of manufacturing the same.

DISCLOSURE OF INVENTION

In order to attain the first object, according to the present invention, there is provided a non-evaporation-type getter which includes a molded body that is formed by powder injection molding and that includes at least one element selected from the group consisting of Ti, Zr, Al, V, and Fe as a principal constituent.

The non-evaporation-type getter according to the present invention is comprised of the molded body formed by powder injection molding, and, therefore, it can have a very complicated shape, as compared with non-evaporation-type getters produced by a conventional powder sintering technique (for example, the powder press sintering technique disclosed in Japanese Patent Laid-open Nos. Hei 8-225806 and Hei 5-159697). This is due to the fact that, in the powder injection molding, a kneaded mixture containing a metallic powder as a principal constituent can be injected into a mold having a complicated shape. In addition, even a molded body having a complicated shape has a shrinkage factor upon sintering that is comparatively stable at all portions, has sufficient mechanical strength as a structure body to be mounted in a gas-tight container of a display apparatus, such as a flat panel display apparatus, and is free of such problems as dusting.

Besides, since the non-evaporation-type getter according to the present invention is comprised of the molded body formed by powder injection molding, it can be produced as a small non-evaporation-type getter having a complicated shape. As a result, a multiplicity of the non-evaporation-type getters according to the present invention can be dispersedly disposed in a minute gap region between substrates in a flat panel display apparatus, such as an FED, without degrading the voltage resistance characteristic between the substrates and without overlapping with the patterns of field emission devices and phosphors.

Preferably, the molded body is comprised of a porous body having a porosity of 10 to 30%. The porosity of the porous body is more preferably around 25%.

When the porosity is too low, the gettering characteristic tends to be lowered; on the other hand, when the porosity is too high, the strength of the molded body tends to be lowered.

The setting the porosity of the molded body within the above-mentioned range ensures that after the molded body is subjected to a predetermined activating treatment, gas is absorbed wastelessly into the inside of the molded body through pores.

Preferably, a coating layer is provided at least on a portion of the molded body. The thickness of the coating layer is not particularly limited, but preferably is about 0.05 to 3 μm.

Preferably, the coating layer includes at least one element selected from the group consisting of Ti, Zr, Al, V, and Fe and is formed on the surface of the molded body by a thin film forming means. The material constituting the coating layer and the material constituting the molded body may be the same as each other or different from each other. The coating layer may be formed on the entire surface of the molded body, on a predetermined one surface of the molded body, or only on a predetermined portion of the molded body. The thin film forming means for forming the coating layer is not particularly limited, and examples of the method include a vapor deposition method, such as an electron beam vapor deposition method, and a sputtering method.

The purpose of providing the coating layer is to enlarge the effective surface area for functioning as the getter, thereby enhancing the gas absorbing capability, or to form a getter coating layer of a material different from the getter material of the molded body itself, thereby controlling the gas absorbing capability on the basis of each kind of gas. From this point of view, the coating layer is a getter layer.

Preferably, the molded body includes Ti as a principal constituent, and the coating layer includes Zr as a principal constituent.

As for the gas absorbing capability of the non-evaporation-type getter produced by use of the electron beam vapor deposition method, Zr used singly can provide a higher capability than does Ti used singly. In the case of Ti used singly, it is easier to obtain a vapor-deposited film with a multi-columnar structure having a larger gas-absorbing area, as compared with the case of Zr used singly. However, in the case of Zr vapor-deposited singly, the gas absorbing capability per unit area is greater, as compared with the case of Ti vapor-deposited singly.

In the present invention, by composing the molded body principally of Ti and composing the coating layer principally of Zr, a non-evaporation-type getter having the advantages of both Ti and Zr can be obtained.

The non-evaporation-type getter according to the present invention is mounted in a gas-tight container of a display apparatus, for example. Alternatively, the non-evaporation-type getter is mounted to a portion of a cathode structure in a cathode-ray tube. Or, the non-evaporation-type getter is mounted in a gas-tight container formed between a front substrate and a back substrate constituting a flat panel display apparatus.

In order to attain the first object, according to the present invention, there is provided a method of manufacturing a non-evaporation-type getter, including the step of performing powder injection molding while using a metallic powder (inclusive of alloy powder) containing at least one element selected from the group consisting of Ti, Zr, Al, V, and Fe as a principal constituent raw material to thereby obtain a molded body having a predetermined shape.

According to the method of manufacturing a non-evaporation-type getter of the present invention, it is possible to obtain a more complicated and smaller non-evaporation-type getter, as compared to the case of a method of manufacturing a non-evaporation-type getter by a powder molding sintering process according to the related art. As a result, a multiplicity of non-evaporation-type getters according to the present invention can be dispersedly disposed in a minute gap region between substrates in a flat panel display apparatus, such as an FED, without degrading the voltage resistance characteristic between the substrates and without overlapping with the patterns of field emission devices and phosphors.

Preferably, the molded body is sintered at a temperature of 60 to 90% (preferably, 70 to 80%) based on the sintering temperature at which the molded body upon sintering will have a true density of not less than 95%.

In the ordinary powder injection molding, the sintering temperature is so selected that the molded body upon sintering will have a true density of not less than 95%. Conventionally, for example, in the case of manufacturing a powder injection molded body including titanium as a principal constituent, the sintering temperature of the molded body has been 1100 to 1300° C.

In the present invention, the true density of the molded body after sintering is preferably in the range of 70 to 90%. Namely, the porosity of the molded body after sintering is preferably 10 to 30%. In order to obtain a molded body with such a porosity, in the manufacturing method according to the present invention, the molded body is sintered at a temperature of 60 to 90% (preferably, 70 to 80%) based on the temperature at which the true density of the molded body after sintering becomes not less than 95%. Therefore, in the present invention, in the case of manufacturing a powder injection molded body including, for example, titanium as a principal constituent, the sintering temperature of the molded body is preferably 850 to 950° C.

In the non-evaporation-type getter, for absorbing more gas (the gas is chemically and physically adsorbed onto the getter), it is necessary to enlarge the effective surface area of the getter. For this reason, the molded body constituting the getter preferably has appropriate pores, so that the gas penetrates and is absorbed throughout the inside of the molded body.

The means for controlling the porosity of the molded body is not particularly limited, however; examples of the means include means of increasing the amount of a binder added to the raw material for powder injection molding and means of reducing the sintering temperature and time.

Preferably, the average grain diameter of the metallic powder is 10 to 20 μm.

The grain diameter of the metallic powder, which is related with the porosity of the powder injection molded body after sintering, is preferably as small as possible, in order to enhance the gas absorbing capability (gettering characteristic).

Preferably, the sintering upon the powder injection molding is carried out in vacuum. The degree of vacuum is not particularly limited and is in the range of $1 \times 10^{-3}$ Pa to 1 Pa, for example. With the sintering carried out in such a vacuum, the effect of degassing from the molded body is promoted, and the oxygen concentration in the molded body after sintering can be suppressed, for example, to about 1 wt % or less. It should be noted, however, that an activating treatment of the molded body by heating in vacuum is needed for putting the molded body into actual operation as a getter, and, therefore, it is unnecessary to rigorously control the oxygen concentration in the molded body after sintering.

Preferably, a coating layer is formed on at least a part of the surface of the molded body after sintering by a thin film forming process.

In order to attain the second object, according to the present invention, there is provided a flat panel display apparatus including:

a back substrate including electron emission sources;

a front substrate that is so disposed as to define a gas-tight container space between itself and the back substrate, which includes phosphors for emitting light by being irradiated with electron beams emitted from the electron emission sources; and a plurality of non-evaporation type getters that are disposed dispersedly in the gas-tight container space and each of which includes a molded body that is formed by powder injection molding and that includes at least one element selected from the group consisting of Ti, Zr, Al, V, and Fe as a principal constituent thereof.

In the flat panel display apparatus according to the present invention, the non-evaporation-type getters according to the present invention are arranged dispersedly, so that a gradient or a nonuniform distribution of the degree of vacuum is suppressed, even in a long-time operation of the flat panel display apparatus. Therefore, it is possible to enhance the electron emission characteristic of the flat panel display apparatus and to contrive a longer life for the display apparatus. In addition, when it is enabled to maintain the inside of the gas-tight container in an ultrahigh vacuum by use of only the non-evaporation-type getters disposed in the inside of the gas-tight container, it is possible to eliminate the need for the getter chamber and the vapor-deposition-type getter that have been provided in the conventional flat panel display apparatus.

Preferably, a spacer or spacers for holding the minute gap between the front substrate and the back substrate are provided in the inside of the gas-tight container space.

The method of mounting the non-evaporation-type getters is not particularly limited, and the non-evaporation-type getters are preferably fixed by fitting into portions of the spacer or spacers.

Alternatively, a structure may be adopted in which a spacer or spacers for holding the minute gap between the front substrate and the back substrate are provided in the inside of the gas-tight container space, and the non-evaporation-type getters function also as at least a part of the spacer or spacers.

Preferably, the non-evaporation-type getters are disposed at such positions as not to hinder the emission of electron beams from the electron emission sources toward the phosphors and not to be connected directly to the front substrate or the back substrate.

Adoption of a floating structure in which the non-evaporation-type getters are not connected directly to the back substrate provided with the electron emission sources or the front substrate having the phosphors ensures that the voltage resistance characteristic between the substrates is not deteriorated. Incidentally, in a flat panel display apparatus, such as an FED, a high voltage of about 5 kV, for example, is impressed between the substrates.

In order to attain the second object, according to the present invention, there is provided a method of manufacturing a flat panel display apparatus according to the present invention, including the steps of:

performing powder injection molding by use of a metallic powder containing at least one element selected from the group consisting of Ti, Zr, Al, V, and Fe as a principal constituent raw material to obtain non-evaporation-type getters having a predetermined shape, preparing a back substrate including electron emission sources, preparing a front substrate including phosphors for emitting light by being irradiated with electron beams emitted from the electron emission sources, preparing a spacer for determining the spacing between the back substrate and the front substrate, press fitting the non-evaporation-type getters into the spacer, and joining the back substrate and the front substrate to each other, with the spacer therebetween into which the non-evaporation-type getters have been press fitted, so as to form a gas-tight container space between the substrates.

In the method of manufacturing a flat panel display apparatus according to the present invention, the non-evaporation-type getters are fixed by press fitting, whereby emission of gas from an adhesive is obviated. Particularly, the conventional manufacturing method has the problem of emission of gas from an adhesive in the case where a multiplicity of non-evaporation-type getters are disposed dispersedly in the inside of the gas-tight container of the flat panel display apparatus; on the other hand, the manufacturing method according to the present invention is free of the bad effect of increasing the emission of gas. Besides, in the manufacturing method according to the present invention, the need for masking for vapor deposition on the substrate is absent, and bad influences of the masking are absent, as contrasted to the manufacturing method in which the non-evaporation-type getters are formed in a predetermined pattern by a vapor deposition process.

BRIEF DESCRIPTION OF DRAWINGS

FIG. 1 is a general sectional view of a flat panel display apparatus according to one embodiment of the present invention.

FIG. 2 is a perspective view showing the relationship between a spacer and a non-evaporation-type getter shown in FIG. 1.

BEST MODE FOR CARRYING OUT THE INVENTION

Figure 3A:
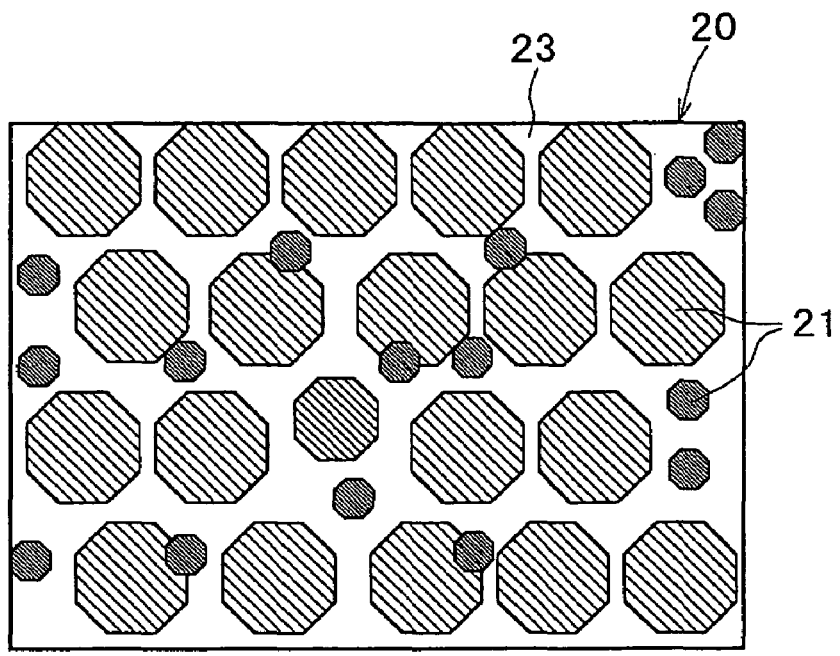
FIG. 3A is an enlarged conceptual diagram of an essential part of the non-evaporation type getter according to one embodiment of the present invention.

Now, the present invention will be described below, based on the embodiments shown in the drawings.

Figure 3B:
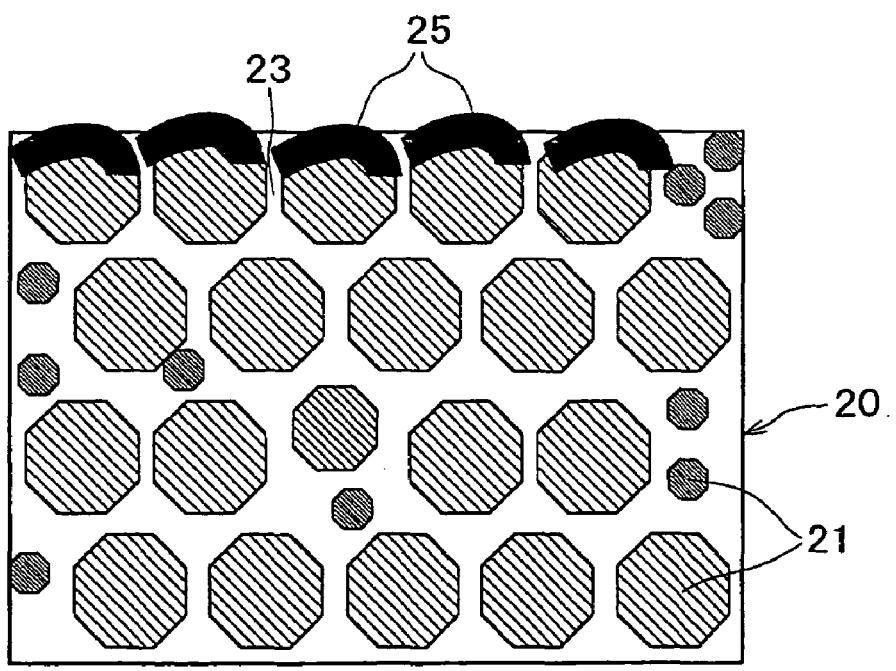
FIG. 3B is an enlarged conceptual diagram of a non-evaporation-type getter according to another embodiment of the present invention.
Figure 5A:
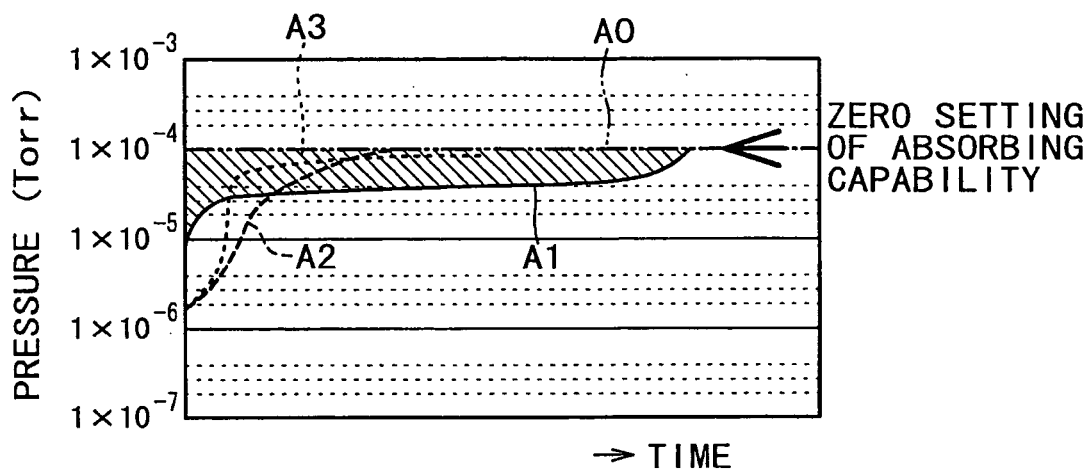
FIG. 5A is a graph showing the gas absorbing capability of the non-evaporation-type getter according to one embodiment of the present invention and the gas absorbing capability of a conventional non-evaporation-type getter.
Figure 5B:
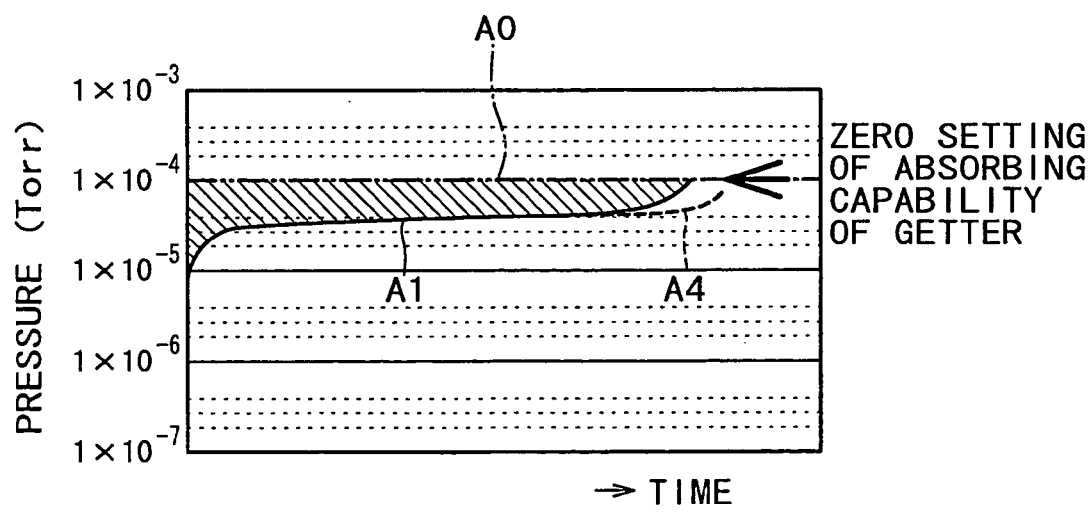
FIG. 5B is a graph showing the gas absorbing capability of a non-evaporation-type getter according to another embodiment of the present invention.
Figure 6A:
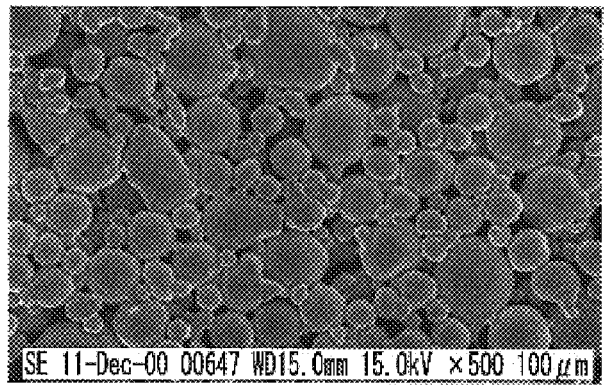
FIGS. 6A to 6C are electron microphotographs of the non-evaporation-type getters according to embodiments of the present invention.
Figure 6B:
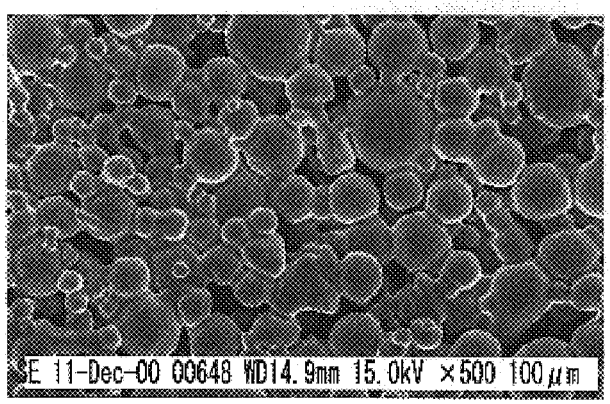
Figure 6C:
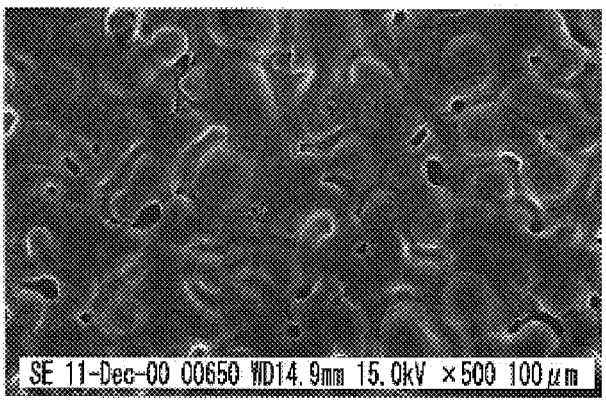
Figure 7:
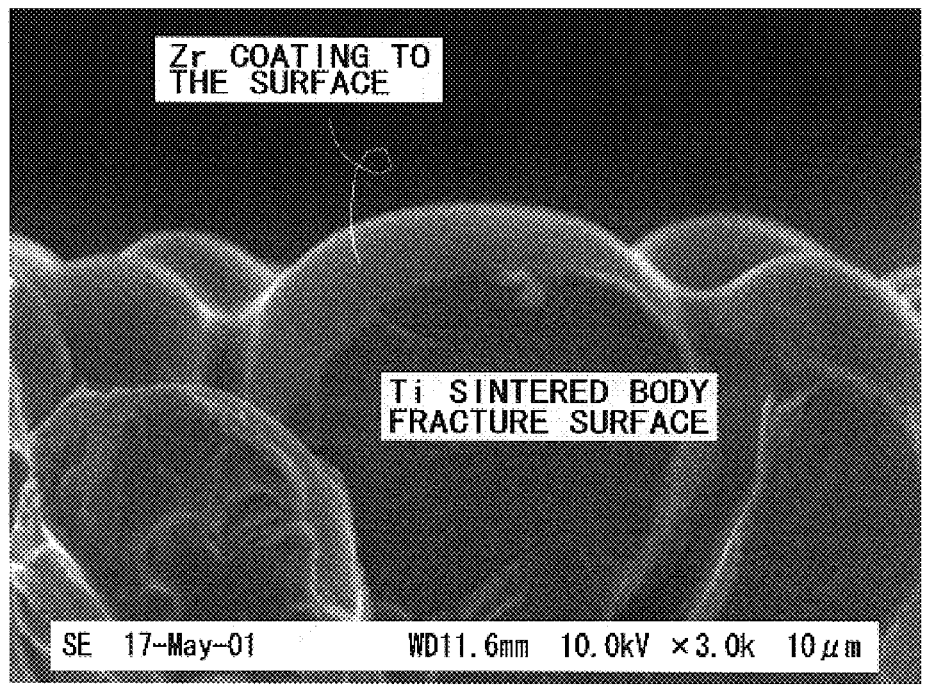
FIG. 7 is an SEM photograph of a non-evaporation-type getter according to another embodiment of the present invention.

FIG. 1 is a general sectional view of a flat panel display apparatus according to one embodiment of the present invention; FIG. 2 is a perspective view showing the relationship between a spacer and the non-evaporation-type getter shown in FIG. 1; FIG. 3A is an enlarged conceptual diagram of an essential part of the non-evaporation-type getter according to one embodiment of the present invention, and FIG. 3B is an enlarged conceptual diagram of a non-evaporation-type getter according to another embodiment of the present invention; FIGS. 4A to 4D are perspective views illustrating the shapes of non-evaporation-type getters according to other embodiments of the present invention; FIG. 5A is a graph showing the gas absorbing capability of the non-evaporation-type getter according to one embodiment of the present invention and the gas absorbing capability of a conventional non-evaporation-type getter, and FIG. 5B is a graph showing the gas absorbing capability of a non-evaporation-type getter according to another embodiment of the present invention; FIGS. 6A to 6C are electron microphotographs of the non-evaporation-type getters according to embodiments of the present invention; and FIG. 7 is an SEM photograph of a non-evaporation-type getter according to another embodiment of the present invention.

As shown in FIG. 1, the flat panel display apparatus 2 according to one embodiment of the present invention is the so-called FED, which includes a front substrate 4 and a back substrate 6 disposed opposite to the front substrate 4, with a predetermined gap spacing D therebetween. The predetermined gap spacing D is, for example, about 1.5 mm or less.

On the inside surface of the back substrate 6, an electron emission source layer 12 is formed in which field emission devices are provided in a predetermined matrix pattern. On the inside surface of the front substrate 4, phosphors 14 for emitting light by being irradiated with electron beams emitted from the field emission devices in the electron emission source layer 12 are provided in a predetermined pattern. Incidentally, while only three phosphors 14 are shown in FIG. 1, in practice a multiplicity of phosphors 14 are provided in a predetermined pattern on the inside surface of the front substrate 4, according to the number of pixels.

A sealing material 8 is provided at the peripheral portion between the front substrate 4 and the back substrate 6 so as to form a flat gas-tight container 5 between the substrates 4 and 6. The sealing material 8 is composed of, for example, frit glass and is formed by applying frit glass to the peripheral portion between the substrates 4 and 6 and heat-sealing the substrates.

In addition, spacers 10 are disposed at a predetermined gap spacing in the inside of the gas-tight container 5 between the substrates 4 and 6 in order to maintain the predetermined gap spacing D. The spacers 10 are composed of a material being electrically insulating or having a high resistance, and they are disposed in the inside of the gas-tight container 5 in such a pattern as not to overlap, in plan view, with the pattern of the phosphors 14 and the pattern of the field emission devices in the electron emission source layer 12.

A getter chamber 30 is connected to the outside surface of a peripheral end portion of the back substrate 6, and the gas-tight container 5 is communicated with the inside of the getter chamber 30 through an evacuation hole 31 formed in the peripheral end portion of the back substrate 6. In addition, a tip pipe 34 is connected to the lower end of the getter chamber 30. The inside of the gas-tight container 5 is evacuated through the tip pipe 34 by an evacuation device or the like, and thereafter the tip pipe 34 is sealed off, whereby the inside of the gas-tight container 5 is hermetically sealed and the inside is maintained in a vacuum condition. Incidentally, a ring-shaped vapor-deposition-type getter 32 is disposed in the getter chamber 30. The vapor deposition type getter 32 includes, for example, Ba or the like as a principal constituent thereof.

In this embodiment, a plurality of non-evaporation-type getters 20 are dispersedly disposed in the inside of the gas-tight container 5 in such a pattern as not to overlap in plan view with the pattern of the phosphors 14 and the pattern of the field emission devices in the electron emission source layer 12. In order to fix the mounting position of each of the non-evaporation-type getters 20, in this embodiment, as shown in FIG. 2, at least some spacers 10 of the plurality of spacers 10 disposed in the inside of the gas-tight container S are each provided with fitting holes 11 in a roughly central portion thereof in the height direction thereof (in the direction of the predetermined gap spacing D) at a predetermined interval along the longitudinal direction thereof. The fitting holes 11 may be through-holes piercing through the thickness (from the face side to the back side) of the spacer 10 or bottomed holes.

As shown in FIG. 2, the non-evaporation-type getter 20 includes a getter main plate 22 and getter sub-plates 24 extending, substantially in parallel to each other at a predetermined interval, from the surface of the getter main plate 22 in a direction substantially orthogonal to the surface. The getter main plate 22 and the getter sub-plates 24 have a width D1 smaller than the predetermined gap spacing D. The getter main body 22 is provided on its back surface with press-fitting projections 26 at the same interval as that of the fitting holes 11 formed in the spacer 10. The press-fitting projections 26 are press fitted into the corresponding fitting holes 11, whereby the non-evaporation-type getter 20 can be fixed positionedly to the wall surface of the spacer 10.

The thicknesses and the length of the getter main plate 22 and the getter sub-plates 24, the number of the getter sub-plates 24 arranged for each getter main plate 22, and the interval of arrangement are so designed as to avoid the pattern of the phosphors 14 and the like.

The getter main plate 22, the getter sub-plates 24 and the press fitting projections 26 constituting the non-evaporation-type getter 20 are integrally molded by powder injection molding, which will be described below.

In the powder injection molding, first, a metallic powder (inclusive of alloy powder) including at least one element selected from the group consisting of Ti, Zr, Al, V, and Fe as a principal constituent thereof and a binder are kneaded to prepare an injection molding material. The average grain diameter of the metallic powder is not particularly limited, and is, for example, 10 to 20 µm. In addition, the binder is not particularly limited, and is, for example, a paraffin-propylene-based binder.

Next, the powder injection molding material is injected into the inside of a mold having a cavity in the shape of the non-evaporation-type getter 20 shown in FIG. 2 to obtain a pre-molded body. Then, the binder contained in the pre-molded body is removed. The process up to this stage is conducted under substantially the same conditions as those in the ordinary powder injection molding. It should be noted, however, that the content of the binder may be increased to be greater than that in ordinary powder injection molding, in order to raise the porosity of the molded body after sintering.

Next, in this embodiment, the pre-molded body is sintered to obtain a molded body composed of a sintered body. The sintering temperature is preferably a temperature of 60 to 90% (preferably, 70 to 80%) based on the sintering temperature at which the true density of the molded body after sintering becomes not less than 95%.

In the ordinary powder injection molding, the sintering temperature is so selected that the true density of the molded body after sintering will be not less than 95%. Conventionally, in the case of manufacturing a powder injection molded body including, for example, titanium as a principal constituent thereof, the sintering temperature for the molded body has been 1100 to 1300° C.

In this embodiment, the true density of the molded body after sintering is preferably in the range of 70 to 90%. Namely, the porosity of the molded body after sintering is preferably 10 to 30%, particularly around 25%. In order to obtain a molded body with such a porosity, in the manufacturing method according to this embodiment, the sintering is carried out at a temperature of 60 to 90% (preferably, 70 to 80%) based on the sintering temperature at which the true density of the molded body after sintering will be not less than 95%. In this embodiment, therefore, in the case of manufacturing a powder injection molded body including, for example, titanium as a principal constituent thereof, the sintering temperature for the molded body is preferably 850 to 950° C.

In the non-evaporation-type getter, it is necessary to enlarge the effective surface area in order to absorb more gas (the gas is chemically and physically adsorbed on the getter). For this reason, the molded body constituting the getter, preferably, has appropriate pores so that gas penetrates and is absorbed throughout the inside of the molded body.

In addition, the sintering is carried out preferably in vacuum. The degree of vacuum is not particularly limited, and is, for example, $1 \times 10^{-3}$ Pa to 1 Pa. With the sintering in such a vacuum, the effect of degassing from the molded body is promoted, and the oxygen concentration in the molded body after sintering can be suppressed, for example, to about 1 wt % or less. It should be noted, however, that since an activating treatment by heating in vacuum is needed for putting the molded body into practical operation as the getter, it is not necessary to control rigorously the oxygen concentration in the molded body after sintering.

Incidentally, the temperature and time of the activating treatment are not particularly limited; for example, the temperature is about 300 to 500° C., and the time is, for example, 1 to 5 hr.

The microstructure of the non-evaporation-type getter 20 composed of the powder injection molded body obtained as described above is as shown in FIG. 3A, in which predetermined pores 23 are formed between grains of the sintered body 21. Incidentally, as shown in FIG. 3B, a non-evaporation-type getter coating layer 25 consisting singly of Zr may be formed on the surface of the sintered body 21 constituting the non-evaporation-type getter 20 by an electron beam vapor deposition process, for example. The film thickness of the coating layer 25 is not particularly limited and is preferably about 0.05 to 3 µm, more preferably about 0.1 to 2 µm.

In the next place, a method of manufacturing the flat panel display apparatus 2 shown in FIG. 1 will be described.

The phosphors 14 are applied to the inside surface of the front substrate composed of a transparent glass or the like by a slurry process, a printing process, an electrodeposition process or a like process. In addition, an electron emission source layer 12 in which field emission devices are arranged in a predetermined matrix pattern is formed on the inside surface of the back substrate 6 composed of a transparent glass, an opaque glass or the like. The pattern of the field emission devices in the electron emission source layer 12 corresponds to the pattern of the phosphors 14.

Next, the front substrate 4 and the back substrate 6 are adhered to each other, with a plurality of spacers 10 therebetween, so that their inside surfaces are opposed to each other at a predetermined gap spacing D. At least some of the plurality of spacers 10 have the above-described non-evaporation-type getter 20 fixed thereto by press fitting, and the plurality of the non-evaporation type getters 20 are disposed in a uniformly dispersed state along the substrate surfaces. Then, a flat gas-tight container S is formed between the substrates 4 and 6 by frit sealing with a sealing material 8. Thereafter, an evacuation device is connected to a tip pipe 34, the inside of the gas-tight container 5 is evacuated, and after the inside of the gas-tight container 5 has reached a target degree of vacuum, the tip pipe 34 is sealed off to obtain the flat panel display apparatus composed of an FED. Incidentally, during the evacuation of the inside of the gas-tight container 5, both the substrates 4 and 6 may be heated for promoting the evacuation, or a heating treatment for activating the non-evaporation-type getters 20 may be conducted. Besides, in order to put the gettering effect of a vapor-deposition-type getter 32 into practice, the getter 32 may be heated to flash by external high-frequency heating.

In the flat panel display apparatus 2 including the gas-tight container 5 in which an ultrahigh vacuum is obtained in the this manner, an operation as the FED can be performed.

The non-evaporation-type getter 20 according to this embodiment is composed of the molded body formed by powder injection molding, and, therefore, it can have a complicated shape as shown in FIG. 2, as compared with a non-evaporation-type getter produced by a conventional powder sintering process (for example, the powder press sintering process disclosed in Japanese Patent Laid-open Nos. Hei 8-225806 and Hei 5-159697). This is because, in the powder injection molding, a kneaded mixture including a metallic powder as a principal component thereof can be injected into a mold having a complicated shape. In addition, even where the molded body has a complicated shape, the molded body has a sufficient mechanical strength for use as a structure body to be mounted in the gas-tight container 5 of the flat panel display apparatus 2 and is free of such problems as dusting.

Besides, since the non-evaporation-type getters 20 are each composed of the molded body formed by powder injection molding, a multiplicity of the non-evaporation-type getters 20 can be arranged dispersedly in the minute gap region between the substrates 4 and 6 in the flat panel display apparatus 2 without deteriorating the voltage resistance characteristic between the substrates 4 and 6 and without overlapping with the patterns of the field emission devices and the phosphors 14.

In addition, in this embodiment, the porosity of the non-evaporation-type getters 20 is set within the predetermined range, whereby it is ensured that gases penetrate and are absorbed wastelessly into the inside of the sintered body 21 through the pores 23 shown in FIG. 3A or 3B.

Besides, with the coating layer 25 formed as shown in FIG. 3B, it is possible to enlarge the effective surface area for functioning as the getter, thereby enhancing the gas absorbing capability, or to form a getter coating layer 25 of a material different from the getter material of the molded body itself, thereby controlling the gas absorbing capability on the basis of the kind of the gas.

As for the gas absorbing capability of the non-evaporation-type getter produced by use of an electron beam vapor deposition process, Zr used singly can have a higher capability than that of Ti used singly. The use of Ti alone has the merit that it is easier to obtain a vapor deposited film with a multi-columnar structure having a larger gas absorbing area, as compared to the use of Zr alone. On the other hand, however, the vapor deposition of Zr alone leads to a higher gas absorbing capability per unit area, as compared with the vapor deposition of Ti alone.

In the embodiment shown in FIG. 3B, with the sintered body 21 including Ti as a principal constituent thereof and with the coating layer 25 including Zr as a principal constituent thereof, a non-evaporation-type getter 20 having the merits of both Ti and Zr can be obtained.

In addition, in the flat panel display apparatus 2 shown in FIG. 1, the non-evaporation-type getters 20 are disposed in a dispersed state, so that a gradient or nonuniform distribution of the degree of vacuum can be suppressed, even in a long-time operation of the flat panel display apparatus. Besides, when it is possible to maintain the inside of the gas-tight container 5 in an ultrahigh vacuum by use of only the non-evaporation-type getters 20 arranged inside the gas-tight container 5, it is possible to eliminate the need for the getter chamber 30 and the vapor-deposition-type getter 32 provided in the flat panel display apparatus 2.

Besides, in this embodiment, the non-evaporation-type getters 20 are arranged at such positions so as not to hinder the emission of electron beams from the electron emission source layer 12 toward the phosphors 14 and not to be connected directly to the front substrate 4 and the back substrate 6. The adoption of such a floating structure in which the non-evaporation-type getters are not in direct contact with the back substrate provided with the electron emission sources and the front substrate including the phosphors ensures that the voltage resistance characteristic between the substrates is not deteriorated. Incidentally, in the flat panel display apparatus 2, such as an FED, a high voltage of about 5 kV, for example, is impressed between the substrates.

Furthermore, in the method of manufacturing the flat panel display apparatus 2 according to the present invention, the non-evaporation-type getters 20 are fixed by press fitting into the spacers 10, whereby liberation of gas from an adhesive is obviated. Particularly, where a multiplicity of non-evaporation-type getters are disposed dispersedly inside the gas-tight container of the flat panel display apparatus by the conventional manufacturing method, there is the problem of liberation of gas from the adhesive; on the other hand, in the manufacturing method according to this embodiment, the bad effect of an increase of liberation of gas is obviated. Besides, in the manufacturing method according to this embodiment, the need for masking for vapor deposition on the substrate is absent, and hence the bad effect of the masking is absent, as contrasted to the method of forming the non-evaporation-type getters in a predetermined pattern by a vapor deposition process.

Incidentally, the present invention is not limited to the above-described embodiment, and various modifications are possible within the scope of the invention.

For example, the specific shape of the non-evaporation-type getter is not particularly limited; namely, for example, as shown in FIGS. 4A to 4D, non-evaporation-type getters 20a to 20d having various shapes may be considered.

Figure 4A:
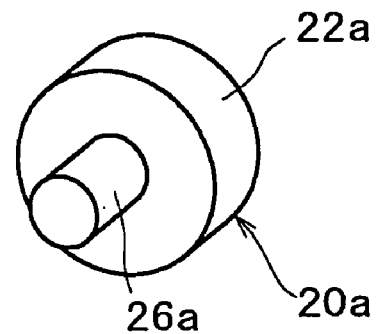
FIGS. 4A to 4D are perspective views illustrating the shapes of non-evaporation-type getters according to other embodiments of the present invention.

The non-evaporation-type getter 20a shown in FIG. 4A includes a cylindrical non-evaporation-type getter main body 22a and a press fitting projected portion 26a, which are integrally molded by powder injection molding. The non-evaporation-type getter 20a is fixed by press fitting into the fitting hole 11 in the spacer 10 in the same manner as the non-evaporation-type getter 20 shown in FIG. 2.

Figure 4B:
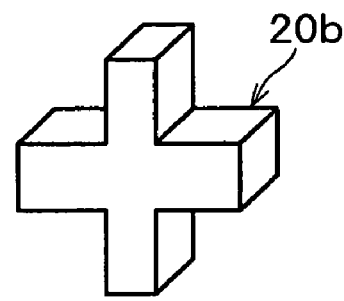

The non-evaporation-type getter 20b shown in FIG. 4B is in the shape of a cross, and it is integrally molded by powder injection molding. The non-evaporation-type getter 20b is disposed at such a location as not to overlap, in plan view, with the pattern of the phosphors 14 shown in FIG. 1.

Figure 4C:
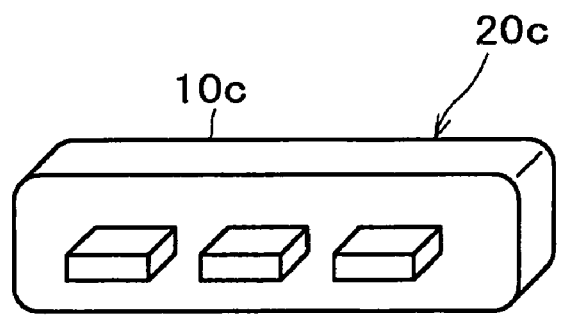

The non-evaporation-type getter 20c shown in FIG. 4C functions also as at least a part of the spacer 10c, and it is integrally molded by powder injection molding.

Figure 4D:
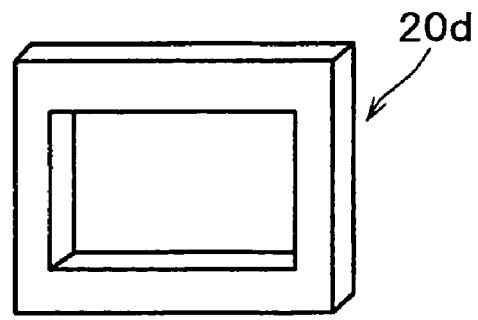

The non-evaporation-type getter 20d shown in FIG. 4D is in the shape of a rectangular frame and is integrally molded by powder injection molding. The non-evaporation-type getter 20d is disposed at such a location as not to overlap, in plan view, with the pattern of the phosphors 14 shown in FIG. 1.

EXAMPLES

Now, the present invention will be described in more detail below based on examples, which are not limitative.

Example 1

In powder injection molding, first, a metallic powder including elemental Ti as a principal constituent and a binder were kneaded with each other, to prepare an injection molding material. The average grain diameter of the metallic powder was 10 to 20 µm. Besides, as the binder, a paraffin-propylene-based binder was used.

Next, the powder injection molding material was injected into a mold having a cavity in the shape of the nonevaporation-type getter 20c shown in FIG. 4C to form a pre-molded body. Then, the binder contained in the pre-molded body was removed. The process up to this stage was carried out under the same conditions as in the ordinary powder injection molding.

Subsequently, the pre-molded body was baked to obtain a molded body composed of a sintered body. The baking temperature was 900° C. The porosity of the molded body after sintering was 25%. An electron microphotograph of the molded body after sintering is shown in FIG. 6A.

Next, the molded body after sintering was subjected to measurement of gas absorbing capability (gettering characteristic) for carbon monoxide (CO) gas. The measurement of gas absorbing capability was carried out after the sintered body as a non-evaporation getter was subjected to an activating treatment at 400° C. in a vacuum of $1\times10^{-3}$ Pa to 1 Pa for 2 hours and cooled. The result is represented by curve A1 in FIG. 5A.

In FIG. 5A, the axis of ordinates indicates the pressure at a predetermined location in a gas absorbing capability measuring instrument, and the axis of abscissas indicates the lapse of time from the start of gas absorption. In this figure, the area defined between pressure straight line A0 corresponding to an absorbing capability of 0 (zero) and curve A1 represents the gas absorbing capability. Namely, the larger the area is, the higher the gas absorbing capability is. As shown in FIG. 5A, it was confirmed that a sufficiently high gas absorbing capability can be obtained.

Comparative Example 1

A non-evaporation-type getter composed singly of Zr and having the same shape and weight as those of the non-evaporation-type getter sintered body in Example 1 was formed by an electron beam vapor deposition process. The non-evaporation-type getter thus obtained was subjected to measurement of gas absorbing capability in the same manner as in Example 1, except that the activating treatment was conducted at 400° C. for 4 hours. The result is represented by curve A2 in FIG. 5A.

Comparative Example 2

A non-evaporation-type getter composed singly of Ti and having the same shape and weight at those of the non-evaporation-type getter sintered body in Example 1 was formed by an electron beam vapor deposition process. The non-evaporation-type getter thus obtained was subjected to measurement of gas absorbing capability in the same manner as in Example 1, except that the activating treatment was conducted at 400° C. for 4 hours. The result is represented by curve A3 in FIG. 5A.

Evaluation

As shown in FIG. 5A, Comparative Examples 1 and 2 showed a higher initial absorbing capability but showed a lower absorbing capability retention effect, as compared with Example 1; namely, the absorbing capability rapidly decreased with the lapse of time in Comparative Examples 1 and 2. The reason for the results is considered as follows. It is considered that, in the case of the vapor-deposition-type getter, it is difficult to form a getter with a stable pore condition, and the inside of the vapor-deposited film is rarely utilized as a getter. On the other hand, the getter in Example 1 showed a stable adsorbing capability from the initial period to the final period, indicating a high reliability of gettering. It is considered that gas is adsorbed also onto the inside of the getter composed of the sintered body, and the entire part of the getter is utilized as a getter.

Example 2

A vapor-deposited film composed singly of Zr was formed by an electron beam vapor deposition process on the surface of the sintered-body getter obtained in Example 1, and the resulting getter was subjected to the same gas absorbing capability test as in Example 1. The thickness of the vapor-deposited film was 0.1 μm. The result is represented by curve A4 in FIG. 5B. In addition, an SEM section photograph of the getter thus obtained is shown in FIG. 7.

As shown in FIG. 5B, the getter obtained in Example 2 showed a further longer life of gas absorbing capability and, as a whole, an enhancement of absorbing capability up to about 10%, as compared with the getter obtained in Example 1.

Example 3

A non-evaporation-type getter composed of a sintered body was formed in the same manner as in Example 1, except that the sintering temperature for the molded body was set to 950° C. A section photograph of the getter thus obtained is shown in FIG. 6B. It was confirmed that pores can be formed sufficiently by this method.

Reference Example 1

A non-evaporation-type getter composed of a sintered body was formed in the same manner as in Example 1, except that the sintering temperature for the molded body was set to 1100° C. A section photograph of the getter thus obtained is shown in FIG. 6C. It was confirmed that less pores can be formed by this method.

As has been described above, according to the present invention, it is possible to provide a non-evaporation-type getter excellent in reliability of gas absorbing capability thereof, capable of maintaining the inside of a gas-tight container in a display apparatus, particularly a flat panel display apparatus or the like, in a high vacuum condition, capable of being mounted easily, and less liable to contaminate the inside of the gas-tight container, a display apparatus including the getters, and methods of manufacturing the same.

In addition, according to the present invention, it is possible to provide a flat panel display apparatus in which a gradient or nonuniform distribution of the degree of vacuum can be suppressed over the entire display region, the reliability of emission of electron beams from electron emission sources such as field emission devices can be enhanced, and a longer life can be contrived, and a method of manufacturing the same.

The invention claimed is:
1. A flat panel display apparatus comprising:
a back substrate comprising electron emission sources;
a front substrate which is so disposed as to define a gas-tight container space between itself and said back substrate, and comprises phosphors for emitting light by being irradiated with electron beams emitted from said electron emission sources; and
one or more non-evaporation type getters which are dispersedly disposed in said gas-tight container space and each of which comprises a molded body comprising at least one element selected from the group consisting of Ti, Zr, Al, V, and Fe as a principal constituent thereof, said molded body formed by powder injection molding; wherein a spacer for maintaining a minute gap between said front substrate and said back substrate is provided in the inside of said gas-tight container space, and said non-evaporation type getters are each fixed by fitting into a portion of said spacer.

2. A flat panel display apparatus comprising:

a back substrate comprising electron emission sources;

a front substrate which is so disposed as to define a gas-tight container space between itself and said back substrate, and comprises phosphors for emitting light by being irradiated with electron beams emitted from said electron emission sources; and one or more non-evaporation type getters which are dispersedly disposed in said gas-tight container space and each of which comprises a molded body comprising at least one element selected from the group consisting of Ti, Zr, Al, V, and Fe as a principal constituent thereof, said molded body formed by powder injection molding, wherein a spacer for maintaining a minute gap between said front substrate and said back substrate is provided in the inside of said gas-tight container space, and said non-evaporation type getters each function also as at least a part of said spacer.

3. A flat panel display apparatus according to any one of claims 1 or 2, wherein said non-evaporation type getters are disposed at such positions as not to hinder the emission of electron beams from said electron emission sources toward said phosphors and not to e connected directly to said front substrate and said back substrate.

4. A method of manufacturing a non-evaporation type getter comprising the step of performing powder injection molding by use of a metallic powder comprising at least one element selected from the group consisting of Ti, Zr, Al, V, and Fe as a principal constituent raw material to thereby obtain a molded body having a predetermined shape, wherein said molded body is sintered at a temperature of 60 to 90% based on a sintering temperature at which the true density of said molded body after sintering will be not less than 95%.

5. A method of manufacturing a non-evaporation type getter according to claim 4, wherein the average grain diameter of said metallic powder is 10 to 20 μm.

6. A method of manufacturing a non-evaporation type getter according to claim 5, wherein said sintering upon said powder injection molding is carried out in a vacuum.

7. A method of manufacturing a non-evaporation type getter according to claim 4, wherein said sintering upon said powder injection molding is carried out in a vacuum.

8. A method of manufacturing a non-evaporation type getter according to any one of claims 4, 5, 6, 7, wherein a coating layer is formed by a thin film forming process on at least a portion of the surface of said molded body after sintering.

9. A method of manufacturing a flat panel display apparatus, comprising the steps of:

performing powder injection molding by use of a metallic powder comprising at least one element selected from the group consisting of Ti, Zr, Al, V, and Fe as a principal constituent raw material to thereby obtain a non-evaporation type getter having a predetermined shape;

preparing a back substrate comprising electron emission sources;

preparing a front substrate comprising phosphors for emitting light by being irradiated with electron beams emitted from said electron emission sources;

preparing a spacer for determining the spacing between said back substrate and said front substrate;

press fitting said non-evaporation type getter into said spacer; and joining said back substrate and said front substrate to each other, with said spacer therebetween into which said non-evaporation type getter has been press fitted, so as to define a gas-tight container space between said substrates.

\* \* \* \* \*

UNITED STATES PATENT AND TRADEMARK OFFICE
CERTIFICATE OF CORRECTION

| | | |
|---|---|---|
| PATENT NO. | : 7,126,276 B2 | Page 1 of 1 |
| APPLICATION NO. | : 10/482380 | |
| DATED | : October 24, 2006 | |
| INVENTOR(S) | : Yoji Hasegawa | |

It is certified that error appears in the above-identified patent and that said Letters Patent is hereby corrected as shown below:

Title Page:
Item (54) should be read as follows:
-- NON-EVAPORATION TYPE GETTER, DISPLAY APPARATUS, AND METHODS OF MANUFACTURING THE SAME --.

Signed and Sealed this

Thirty-first Day of July, 2007

JON W. DUDAS
*Director of the United States Patent and Trademark Office*